3,221,127
MANUAL ADJUSTING MEANS FOR ELECTRIC PERCOLATOR

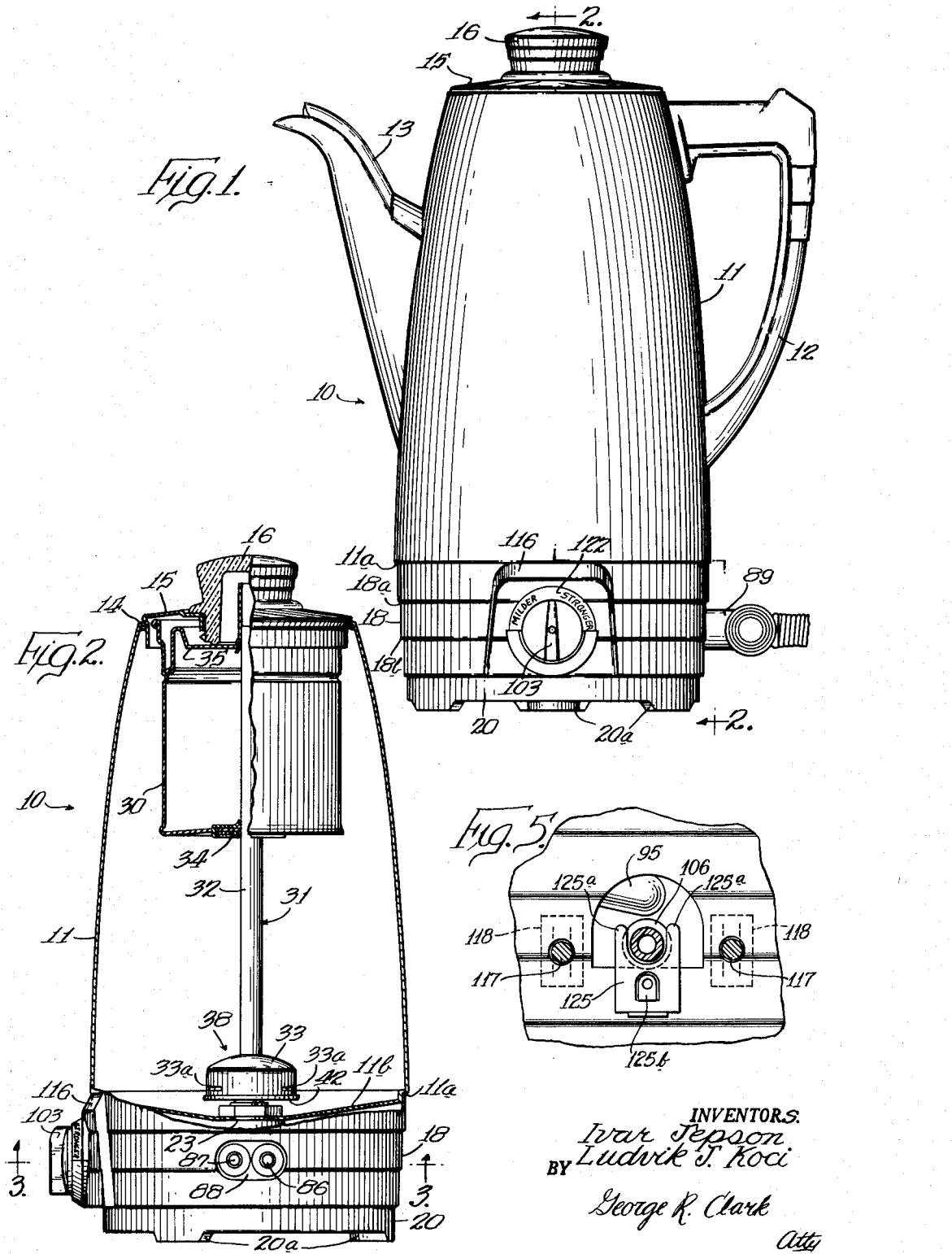

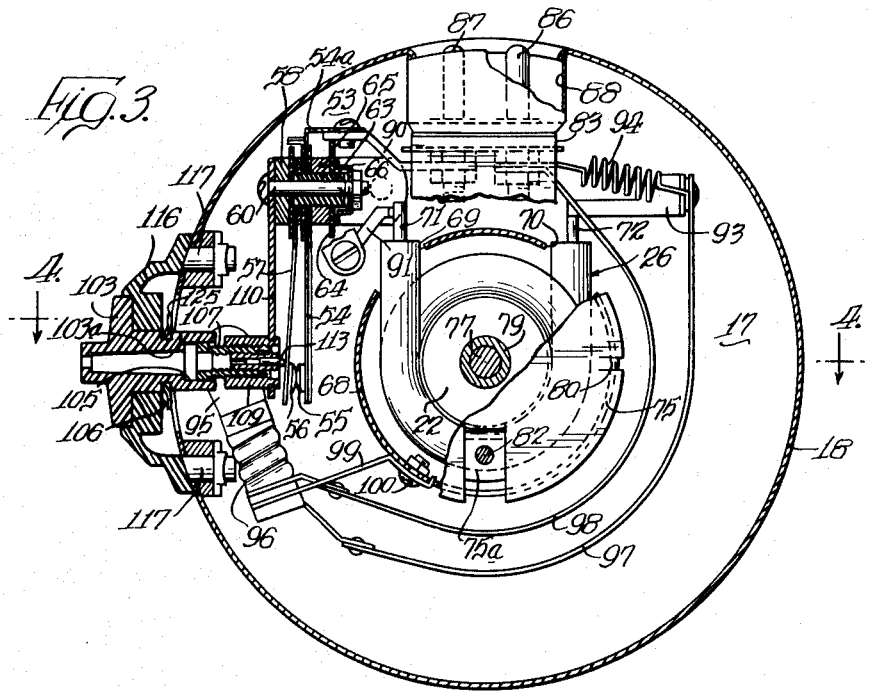
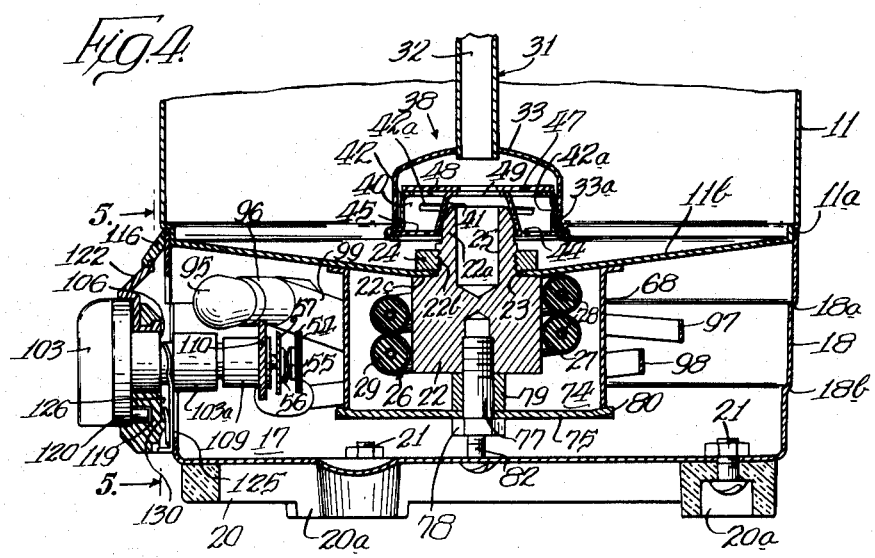
INVENTORS.
Ivar Jepson
BY Ludvik J. Koci
George R. Clark
Atty

Ivar Jepson, 547 Linden Ave., Oak Park, Ill., and Ludvik J. Koci, 31st and York Road, Rte. 2, Hinsdale, Ill.
Application Apr. 16, 1959, Ser. No. 806,878, which is a division of application Ser. No. 380,722, Sept. 17, 1953, now Patent No. 2,903,552, dated Sept. 8, 1959. Divided and this application Mar. 9, 1962, Ser. No. 178,762

3 Claims. (Cl. 200—139)

The present application is a division of copending application Serial No. 806,878, filed April 16, 1959, now abandoned, which in turn is a division of copending application Serial No. 380,722, filed September 17, 1953, now Patent No. 2,903,552, granted September 8, 1959.

The present invention relates to an electric percolator, and, more particularly, to an improved control arrangement for such an electric percolator, which control arrangement might also be used for controlling other electrically heated appliances particularly adapted to the preparation of beverages.

There are several types of coffeemaking appliances on the market today, each of which uses a somewhat different principle of operation. One of these coffeemaking devices is generally referred to as the vacuum type coffee maker, a specific example of which is that disclosed and claimed in United States Letters Patent No. 2,312,555 Jepson, granted March 2, 1943, and assigned to the same assignee as the present application. The arrangement disclosed in the above-mentioned Jepson patent is one that is fully automatic in that once the coffee maker is set to operate the coffee will be brewed, and upon completion of the brewing operation the completed coffee will be maintained at a uniform serving temperature, which is lower than the brewing temperature. Another of these different types of automatic coffee making device comprise what has been commonly termed a percolator, which operates upon a somewhat different principle than the vacuum type coffee maker. In the percolator the coffee grounds are retained in a basketlike arrangement in the upper part of the coffeemaking vessel, and by means of a sort of pumping action hot water is caused to move upwardly through a tube into the basket, where the hot water encounters the ground coffee. This pumping or percolating action is continued until the desired strength of brew is obtained. There are, of course, still other coffeemaking devices operating on still different principles, one of which is commonly referred to as the drip type of coffeemaking device. The present invention, however, is primarily concerned with a coffeemaking device embodying the so-called percolator principle of making coffee. It should be understood, however, that although specifically disclosed as applied to a fully automatic electric percolator, the present invention may have other application, and the specific application illustrated is by way of example only.

The public has come to require that an automatic coffeemaking device include means for not only automatically brewing the coffee at a relatively high temperature, but thereafter terminating the brewing operation at a selectively desired time and subsequently maintaining the brewed coffee at a temperature below the brewing temperature, which lower temperature is a desirable serving temperature. An arrangement for accomplishing this, which has proven to be very successful in connection with the vacuum type coffee maker, is that disclosed in the above-mentioned Jepson Patent No. 2,903,552. Automatic electric percolators must be sold on the market at a price substantially below that for which fully automatic vacuum type coffee makers are sold, and hence it is essential that control means for performing the desirable functions noted above be simple, compact and inexpensive. For an electric percolator there should be provided electric control means which will permit a high temperature operation during the brewing or percolating period for a period of time which is variable, and selected by the user in accordance with the strength of the coffee desired. This control means should subsequently maintain the coffee at a serving temperature without any possibility of causing a repercolating operation. Such electric percolators usually having a heating element which may have a rating of the order of four hundred watts in order to produce the desired coffee percolation within a minimum period of time. To maintain the coffee at a desired serving temperature requires supplying electrical energy of the order of about one-tenth or less of the four hundred watts mentioned above. Heretofore it has been common practice to provide a second or third heating element of a relatively low fixed wattage for the electric percolator to supply the heat losses by virtue of a low ambient temperature and to maintain the coffee at a desired serving temperature. Unfortunately, such fixed wattage elements, which might be of the order of forty watts or thereabouts, are unsatisfactory due to the large number of variable conditions that are likely to be encountered. For example, electrical distribution circuits operate at variable voltages which will, of course, cause a substantial variation in the temperature at which the coffee is maintained for serving if a fixed wattage element for this purpose is employed. Likewise, variable quantities of liquid or coffee are likely to be involved, since it is common practice to use the coffeemaking device for making anywhere from one cup to eight cups or ten cups, and, obviously, a heating device which will maintain a desirable serving temperature as far as two cups of liquid are concerned will not be satisfactory in the event that eight or ten cups are to be made. Even more of a factor in making a fixed wattage element undesirable for supplying the heat losses necessary to maintain a uniform serving temperature in connection with an electric percolator is the variation in ambient temperature encountered. If the coffeemaking device is subjected to drafts, for example, at one time, and to no drafts at another time, a marked difference in the serving temperature that will be maintained by a fixed wattage heating element for this purpose will be observed. It is essential, therefore, that a control means be provided which is independent of the variables noted above insofar as maintaining the coffee at a desirable serving temperature is concerned. It is, furthermore, desirable from the standpoint of providing a device which can be marketed competitively that the control means employ only a single switch and a single heating element controlled by a single bimetallic element which will give all the necessary control in making the coffee and in subsequently maintaining it as a desired serving temperature.

Electric percolators comprise some form of pump to force the water into the coffee basket. Such pumps have heretofore been commonly made of aluminum die castings, and after only a short use have been found to corrode to such an extent that replacement is often necessary. It would be desirable to provide a pump which will not corrode and yet which can be made in an inexpensive manner, and which can be assembled and disassembled with ease.

Accordingly, it is an object of the present invention to provide a new and improved electric percolator.

It is another object of the present invention to provide an improved control means for a coffeemaking device which is simple and inexpensive, and which will provide fully automatic control for such coffeemaking device.

Further objects and advantages of the present invention will become apparent as the following description proceeds, and the features of novelty which characterize the invention will be pointed out with particularity in the claims annexed to and forming a part of this specification.

For a better understanding of the present invention, reference may be had to the accompanying drawing in which:

FIG. 1 is an elevational view of an electric percolator embodying the present invention;

FIG. 2 is a view partly in section taken substantially along line 2—2 of FIG. 1;

FIG. 3 is a greatly enlarged sectional view taken on line 3—3 of FIG. 2;

FIG. 4 is a sectional view taken on line 4—4 of FIG. 3, assuming that FIG. 3 shows the complete structure; and FIG. 5 is a sectional view taken on line 6—6 of FIG. 4, assuming that FIG. 4 shows the complete structure.

The features of the electric percolator embodying the present invention are disclosed and described in Jepson et al. Patent No. 2,903,552. The drawings of the present application embody the identical reference numerals employed for the various parts in Jepson et al. Patent No. 2,903,552. The disclosure of the above-mentioned Jepson et al. patent is incorporated herein by reference.

Referring now to the drawings, there is illustrated in FIG. 1 the electric percolator of the present invention, generally designated by the reference numeral 10. The percolator 10 comprises a fluid container 11, preferably formed of spun copper or the like, which fluid container is provided with a suitable handle 12 formed of insulating material which might comprise a phenolic resin of some sort. A spout member 13, which may comprise a die casting, is attached to the fluid container 11 in a conventional manner to permit pouring liquid contained in the vessel 11. The shape of the vessel 11 can best be observed from the sectional view of FIG. 2 of the drawings. Preferably the vessel 11 is provided with an open top, a suitable rolled edge 14 defining a circular opening. This opening is preferably closed by a suitable cover 15, which cover is provided with a central cover knob 16. The knob 16, as is conventional with percolators, is preferably formed of clear glass, so that it will permit viewing the operating condition of the percolator by the user thereof. The knob 16 is readily removable in a manner well understood by those skilled in the art, so that in the event of breakage it may be replaced in a simple manner.

For the purpose of defining a control chamber 17 beneath the vessel 11, there is provided a somewhat cup-shaped member 18 formed of brass or the like, secured in the manner described hereinafter to the bottom of the vessel 11. As is best shown in FIG. 4 of the drawings, the cup-shaped member 18, which might be termed the bottom cover member, appears to provide a continuation of the vessel 11. Actually, the vessel 11 is provided at its lower end with an annular shoulder portion 11a, against which the open end of the cup-shaped member 18 is seated. Moreover, the cup-shaped member 18 is illustrated as having a plurality of annular shoulders 18a and 18b which provide a pleasing appearance and look just like the shoulder 11a. As may be observed from FIGS. 1 and 5, the annular shoulders 11a, 18a and 18b, and the sort of shoulder formed by the bottom of member 18, provide a pleasing appearance giving the percolator 10 the appearance of having the lower portion thereof defined by a plurality of sections of decreasing diameter when moving downwardly from the shoulder 11a. As best shown in FIG. 4 of the drawings, the vessel 11 is provided with an inclined bottom 11b extending downwardly from the shoulder 11a to a central portion which defines the lowermost portion of the container 11.

In order to support the percolator 10 from a suitable support, there is secured to the bottom cover member 18 a base member 20 which may be formed of a suitable insulating material such as a phenolic resin or the like molded to the desired configuration to provide a ring member having a plurality of spaced integral legs 20a. As best shown in FIG. 4 of the drawings, the base 20 is preferably secured to the bottom cover member 18 by suitable fastening means 21. It will be apparent that the base 20 will thermally insulate the percolator 10 from any surface upon which it is placed. Preferably, the base 20 and the handle 12 have the same color so as to provide a pleasing appearance. Likewise, the vessel 11, the bottom cover member 18, and the cover 15 are suitably plated to provide a highly polished pleasing appearance. In a commercial embodiment constructed in accordance with the present invention, the percolator 10 was provided with a black base 20 and handle 12, while the body portion thereof was chrome-plated. Obviously, the particular configuration or appearance of the percolator 10 forms no part of the present invention, but is disclosed and claimed in a copending design application, now patent Des. 173,731, granted December 28, 1954 and assigned to the same assignee as the present application.

As is common practice in electric percolators, suitable electric heating means are provided for heating liquid contained within the container 11. It is desirable, however, to provide heating means which will insure percolation within a short time, such as within one minute after the electric heating means is connected to a source of electric energy. To this end and in accordance with the present invention, there is provided a brass or other suitable thermal conducting stud 22 in the form of a substantial mass of metal having one end in the form of an extension of reduced cross section designated by the reference numeral 22a. This extension of reduced cross section, as is best shown in FIG. 4 of the drawings, is adapted to be inserted within the centrally defined opening 23 in the bottom 11b of the liquid container 11. The extension 22a is provided with a threaded portion 22b to receive a suitable nut 24 whereby the shoulder portion 22c of the stud 22 is clamped against the underside of the bottom 11b in a manner to define a liquid-tight vessel 11. The stud 22 is provided with a pump or steam generating chamber 25 of small volume in the open end thereof, which opens into the vessel 11.

In order to heat the liquid within the liquid container 11, and specifically to heat any liquid within the steam generating chamber 25, there is provided a suitable heating element 26 illustrated as in good heat exchange relationship with the stud 22. Specifically, the heating element 26 is illustrated as disposed in a coil of a few turns around the stud 22, which coil is preferably brazed or otherwise secured to the stud 22. As illustrated, the heating element 26 is preferably of the well-known sheathed form comprising an outer metal sheath 27 within which is disposed a resistance element 28, preferably in the form of a spiral coil of resistance material. The resistance element 28 is centrally disposed of the sheath 27, and is supported in that position by suitable electrical insulating material 29 which also provides a good heat conductor. This material 29 may comprise fused magnesium oxide, which is a good heat conductor and at the same time provides the necessary electrical insulation. With this construction it will be apparent that the heating element 26, which for a particular embodiment of the present invention may have a rating of four hundred watts, will provide a very high heat for the steam generating chamber 25, and, subsequently, will heat the liquid within vessel 11.

To make coffee by the percolator principle, there is provided within the chamber 11 the conventional basket or coffee ground container 30 supported near the upper part of the vessel 11 by means of the basket tube assembly generally designated as 31 and comprising a tube 32 secured at the lower end to a valve cover 33. The basket 30 is provided with a central aperture through which the upper end of the tube 32 extends. In order to support the basket 30 from the tube 32, there is provided a suitable basket washer 34 secured as by silver solder or the like to the tube 32. Preferably, a suitable cover member 35 is provided for the basket 30 which like the basket 30 includes a plurality of small openings to permit the liquid to pass through the coffee grounds which are placed in the basket 30 and to return into the vessel 11.

To force the liquid through the tube 31, which tube performs a dual function, namely, supports the basket 30 and also conveys fluid thereto, there is provided a pump and valve arrangement generally designated by the reference numeral 38, and fully described in the aforesaid Jepson et al. Patent No. 2,903,552.

As was discussed above, it is desirable to provide automatic control means for heating element 26, so that coffee of the desired strength is made by heating the liquid to a relatively high temperature, and thereafter the completed coffee is maintained at a lower serving temperature. It is, of course, absolutely essential that once the pumping action or percolating action has been terminated, with the coffee at the proper strength, no possibility of repercolating the coffee can occur. Accordingly, the control means fully described in Jepson et al. Patent No. 2,903,552 is disposed within the chamber 17 defined beneath the vessel 11 and within the cup-shaped housing 18. Since the control means involves controlling the liquid in vessel 12 in two temperature ranges by means of a single heating element 26, obviously it is necessary to have some thermal responsive device including a switch for this purpose. A suitable thermal responsive device and switch for this purpose is fully disclosed in the aforesaid Jepson et al. Patent No. 2,903,552.

As fully described in the aforesaid Jepson et al. patent, there is provided a closure plate 75 which is in some respects a bracket for supporting certain parts of the percolator 10, including the bottom cover plate 18. This bracket 75 is secured against the bottom open end of the shield 68 by suitable fastening means including a stud 77 secured to the stud 22, and a nut 78 fastened to this stud. Preferably, a sleeve 79 surrounding the stud 77 positions the bracket 75.

To permit fastening of the member 18 to the bracket 75, the latter includes integral lugs 75a, which are provided with tapped openings 81 to receive suitable fastening means 82 extending through the bottom of the cup-shaped housing member 18, whereby the same is secured to the bottom of the vessel 11 in a simple and yet readily removable manner. The bracket 75 includes a lateral projection 83 for supporting a pair of contact pins 86 and 87, providing bayonet type contacts for connection with a conventional appliance cord. These bayonet type contacts are, of course, suitably insulated from the support 83, and a plug guard 88 effectively defines a recess in the bottom cover plate 18 into which a conventional plug connector 89 (see FIG. 1) may be inserted in a manner well understood by those skilled in the art.

For the purpose of providing selective operation of the percolator 10 so that coffee of carying degrees of strength may be produced, there is provided a manual control knob 103 which includes an integral shank 103a having an enlarged hexagonal recess 105 defined in the end of shank 103a remote from the knob 103. The shank 103a is also provided with a peripheral groove 106 defining detent means. The knob shank 103a is referably connected with a control rod sleeve 107 which has a hexagonal head 107a fitting within the hexagonal recess 105. The control rod sleeve 107 is provided with a longitudinally extending passageway therein. The control rod sleeve is both externally and internally threaded. The external threads of the control rod sleeve 107 threadedly engage a control rod nut 109 which is supported from a suitable bracket 110. The bracket 110 is illustrated in FIG. 3 of the drawings as being supported from the heat lug designated as 58. As illustrated, the end of the bracket 110 remote from the heat lug 58 is provided with an opening for receiving a portion of reduced cross section of the control rod nut 109, which is then peened over to secure the same to the bracket 110.

In order to provide a suitable housing and dial arrangement cooperative with the knob 103, there is provided an escutcheon member 116, which is provided with suitable fastening means 117 (see FIG. 5 of the drawings) for securing the same to the bottom cover 18. Suitable speed nuts 118 cooperate with the fastening means 117. This escutcheon plate includes an opening for receiving the shank 103a of the knob 103, and also includes an arcuate recess 119 for receiving a pin 120 secured to the knob 103. The recess 119 has such an arcuate extent as to limit the maximum clockwise and counterclockwise rotation of the knob 103. Preferably also, a dial member 122 is supported in the escutcheon 116, which dial member is preferably formed of a translucent material so that light from a suitable bulb 95 may be visible therethrough when the heating element 26 is energized. Suitable indicia, such as "Milder" and "Stronger," may be applied to the dial 122, as indicated in FIG. 1 of the drawings.

In accordance with the present invention, unique latching means are provided for retaining the knob 103 in position and yet permitting ready removal thereof for removing the bottom cover 18. To this end there is provided a removable leaf spring member 125 which is insertable within a recess 126 defined between the bottom portion of the escutcheon 116 and the bottom cover 118. This leaf spring terminates in a pair of bifurcations 125a, receivable within the peripheral groove 106 in the shank 103a thereby preventing movement of the knob 103 in a direction along the longitudinal axis of the shank 103. The spring 125 is retained in position by virtue of an integral spring finger 125b which engages a shoulder 130 on the escutcheon 116, as is shown in FIG. 4 of the drawings. This spring locking member 125 is completely hidden from view and yet will permit a repairman to obtain immediate access to the control rod adjustment.

While there has been illustrated and described what at present is believed to be a preferred embodiment of the present invention, numerous changes and modifications will readily occur to those skilled in the art. It is aimed in the appended claims to cover all those changes and modifications which fall within the true spirit and scope of the present invention.

What is claimed as new and desired to be secured by Letters Patent of the United States is:

1. In an automatic temperature regulated appliance including a heat responsive control device, a cup-shaped base structure enclosing said device, means within said base structure for varying the response of said heat responsive device, manually actuatable means positioned exteriorly of said structure and extending through a wall of said base structure into said base structure for selectively actuating said varying means, said manual means including detent means closely adjacent where said manually actautable means passes through said wall, means in said base structure definining a recess extending from the bottom of said cup-shaped base structure into proximity with said detent means, and latching means positioned in said recess and engaging said detent means to prevent removal of said manually actuatable means without first removing said latching means.

2. The temperature regulated appliance of claim 1 wherein means for varying the effectiveness of said adjusting means are provided, said last mentioned means being accessible from the exterior of said housing.

3. In an automatic coffee maker the combination of a temperature responsive device having a control element and a housing enclosing said element, a control knob including a shank rotatably mounted relative to said housing said shank extending through a wall of said housing, a circumferential groove defined in said shank adjacent where said shank passes through said wall, means disposed within said housing and rotatable with said shank for engaging said control element, said last mentioned means including means for varying the position thereof relative to said shank, means extending into said housing through said shank for varying the position of said shank relative to said control knob, means definining a recess in said wall extending from the bottom of said housing to said shank, and latching spring means disposed in said recess and engageable with said circumferential groove, said latching spring means being removable from the bottom of said housing.

References Cited by the Examiner

UNITED STATES PATENTS

| | | | |
|---|---|---|---|
| 954,785 | 4/1910 | Craven | 251—11 X |
| 1,616,519 | 2/1927 | Twombly | 236—16 |
| 1,795,839 | 3/1931 | Credle | 251—291 X |
| 2,076,096 | 4/1937 | Samuels | 99—281 |
| 2,107,924 | 2/1938 | Adams | 99—281 |
| 2,493,248 | 1/1950 | Hughes | 251—360 |
| 2,575,312 | 11/1951 | Buttner | 251—360 |
| 2,668,378 | 2/1954 | Vance. | |
| 2,718,572 | 9/1955 | Harris | 200—138 |

ROBERT K. SCHAEFER, *Acting Primary Examiner.*

JOSEPH D. BEIN, BERNARD A. GILHEANY, *Examiners.*